United States Patent [19]

Loeb et al.

[11] Patent Number: 5,245,656
[45] Date of Patent: Sep. 14, 1993

[54] SECURITY METHOD FOR PRIVATE INFORMATION DELIVERY AND FILTERING IN PUBLIC NETWORKS

[75] Inventors: Shoshana K. Loeb, Basking Ridge; Yacov Yacobi, Berkeley Heights, both of N.J.

[73] Assignee: Bell Communications Research, Inc., Livingston, N.J.

[21] Appl. No.: 942,692

[22] Filed: Sep. 9, 1992

[51] Int. Cl.$^5$ ............................................. H04L 9/32
[52] U.S. Cl. ..................................... 380/23; 380/4; 380/9; 380/25; 380/30; 380/49; 340/825.31; 340/825.34
[58] Field of Search ................... 380/9, 21, 23, 25, 30, 380/43, 49, 50, 3, 4; 340/825.31, 825.34

[56] References Cited

U.S. PATENT DOCUMENTS

| | | | |
|---|---|---|---|
| 4,914,698 | 4/1990 | Chaum | 380/30 |
| 4,926,480 | 5/1990 | Chaum | 380/23 |
| 4,947,430 | 8/1990 | Chaum | 380/25 |
| 4,987,593 | 1/1991 | Chaum | 380/30 X |

OTHER PUBLICATIONS

"Kerberos: An Authentication system for Open System Networks," J. G. Steiner et al., Usenix Conference Proc., Winter 1988, pp. 191-202.

Primary Examiner—Bernarr E. Gregory
Attorney, Agent, or Firm—Leonard Charles Suchyta

[57] ABSTRACT

A method for operating customized information services via a network comprising transmitting the identity U of an end-user station via the network to a name translator station. At the name translator station, the identity U of the end-user station is translated into a pseudonym U'. The pseudonym U' is transmitted from the name translator station via the network to a filter station. The pseudonym U' is transmitted from the filter station via the network to a service provider station. In response, the service provider station transmits to the filter station an encrypted information description describing information available from the service provider station. At the filter station, the encrypted information description is compared with an encrypted information profile of the end-user station to identify specific information to be transmitted from the service provider station to the end-user station. An indicator is then transmitted from the filter station to the service provider station indicating the specific information to be transmitted to the end-user station. The specific information is then transmitted via the name translator station to the end-user station in an encrypted form not accessible to the name translator station. The specific information is decrypted at the end-user station. This technique protects end-user privacy by insuring that no logical entity is aware of the end-user identity and also aware of the end-user profile and content of the information the end-user receives.

14 Claims, 1 Drawing Sheet

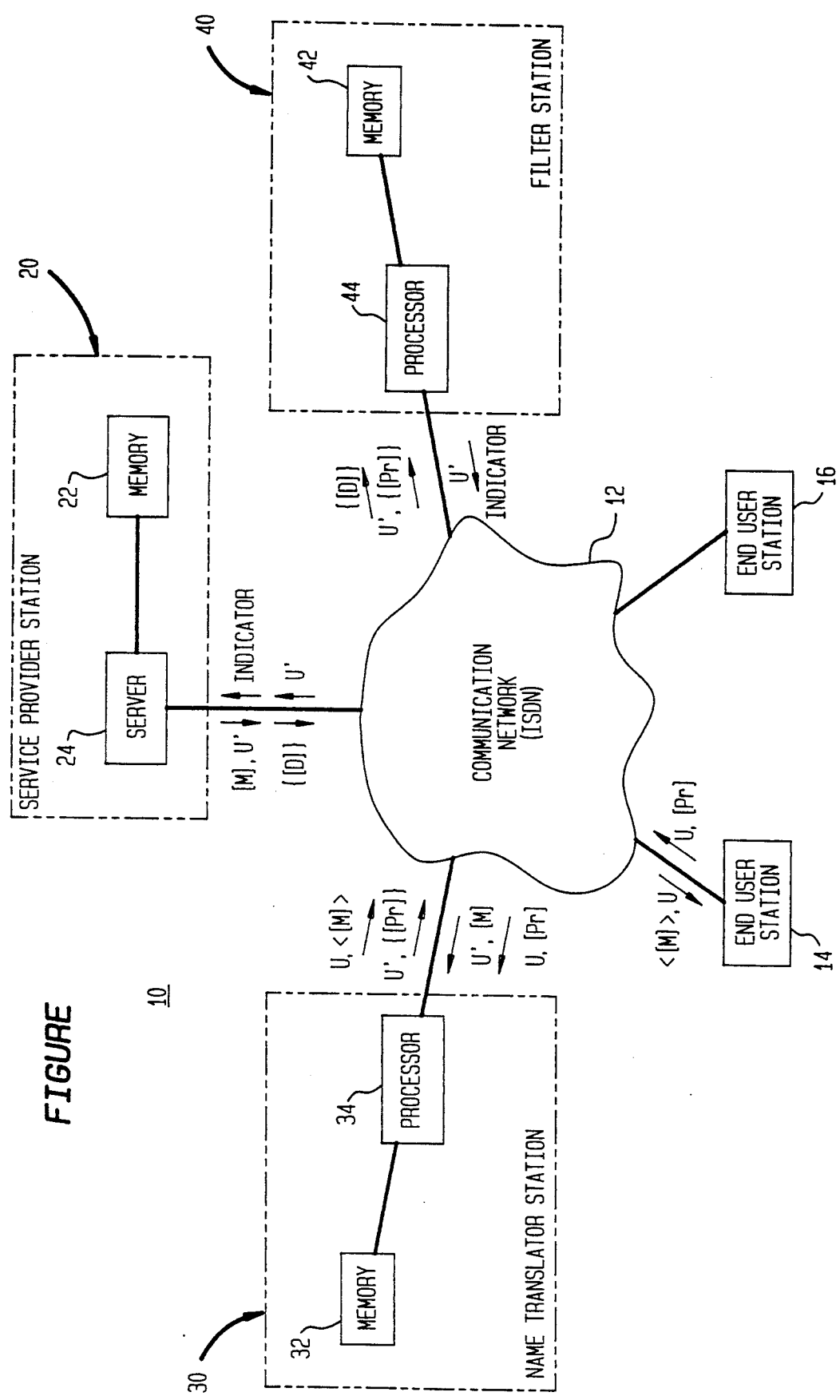

SECURITY METHOD FOR PRIVATE INFORMATION DELIVERY AND FILTERING IN PUBLIC NETWORKS

FIELD OF THE INVENTION

The present invention relates to a method for operating private filters in a public communication network. The inventive method is especially applicable for protecting end-user privacy in networks which provide customized information delivery services.

BACKGROUND OF THE INVENTION

The automatic operation of customized information delivery services depends on the availability of stored profiles about an end-user's needs and wants. These profiles contain information about end-user demographics, interests, history of information delivered, and specific viewing habits. A large number of end-users desire to have the privacy of their profile information protected. In addition, a large number of end-users want the actual information delivered by the information delivery services to be private and untraceable. If end-user privacy is protected, such information delivery service are likely to be attractive to a larger number of potential users. Therefore, personalized information delivery service providers and the networks which transmit the actual information can be expected to have a larger customer base if end-user privacy is protected. It is an object of the present invention to provide a method for operating customized information services so as to protect end-user privacy.

Typically, a network which provides such customized information services includes a filter which serves to compare descriptions of information made available by the service provider with individual profiles of information desired by end-users. Such a filter serves to control the transmission of information via the network between the service provider and the end-user. To make filtering services cost effective, it is desirable to place the information filter in a single centralized location rather than at the information source (service provider) or at the information sink (end-user). A centrally accessible filtering facility lowers the storage and bandwidth requirements of the Customer Premises Equipment used by the end-user. Furthermore, it prevents the delivery to the end-user of redundant information which may arise if a plurality of service providers independently filter and deliver information. Providing the filtering service in a centralized facility vastly reduces the complexity of the hardware and software maintenance involved in running and updating the filtering service. In addition, as users become more mobile, with the rapid introduction of cellular communications, for example, centralized filtering helps provide customers with personalized information access anywhere.

Centralization of filtering poses a privacy threat because a very detailed profile of each end-user has to be stored at the filter.

Accordingly, it is a further object of the present invention to provide a method for operating customized information services in which the privacy of both end-user profiles maintained at a central filter and transmitted information is protected.

SUMMARY OF THE INVENTION

The present invention is a method for operating customized information services via a communication network. The privacy of the actual information transmitted from the service provider to the end-user is protected. The privacy of a profile maintained for each end-user at a central filter location is also protected. This is accomplished by using encryption techniques to insure that no logical entity is aware of the identity of the end-user, and also aware of the end-user profile and content of the information the end-user receives. The most that any entity knows is either the identity of the end-user or the contents of the end-user profile and the contents of the delivered information.

DESCRIPTION OF THE DRAWINGS

The FIGURE schematically illustrates a system for providing customized information services in accordance with the present invention.

DETAILED DESCRIPTION OF THE INVENTION

A system for providing information delivery services is schematically illustrated in the FIGURE.

The system 10 for delivering information services comprises a communication network 12. The communication network 12 may be the public switched telephone network. To handle information services the public switched telephone network may be upgraded to an Integrated Services Digital Network (ISDN). The communication network 12 may also be formed by a wide area or local area communication network.

Connected to the network 12 are a plurality of end-user stations 14 and 16. Illustratively, each of the end-user stations 14 and 16 includes audio input and output devices, a video display device, a keyboard and an appropriate amount of data processing capability in the form of local CPU and memory.

An information service provider station 20 and is also connected to the network 12. The information service provider station 20 transmits information to the end-users via the network 12 in response to requests received from the end-users. Illustratively, the service provider station 20 contains a memory 22 with a capacity sufficient to store the information to be supplied to the end-users and a server 24 for processing memory access requests so as to manage access to the associated memory 22.

The FIGURE also shows a name translator station 30 and a filter station 40 connected to the network 12. The name translator station 30 and the filter station 40 are both implemented by data processing systems including a memory 32, 42 and an associated processor 34, 44 for managing access to the memory 32, 42 and for performing various data processing tasks. In the name translator station 30, the memory 32 contains a translation table which maps an actual identity U of each end-user station 14, 16 into a pseudonym U'. The name translator station 30 translates the identity U of a user station 14, 16 into a pseudonym U' so that neither the filter station 40 nor information provider station 20 ever learns the actual identity U of an end-user station requesting service, but rather learns only the pseudonym U'. In the filter station 40, the memory 42 stores user profiles of the end-user stations 14, 16. The user profiles stored at the filter station 40 are each associated with a pseudonym U' but there is no way to associate a user profile with an actual end-user identity U. The user profiles stored at the filter station are encrypted in a manner discussed below.

Three session keys are set up in the system 10 of the FIGURE. These session keys are as follows:

1) $K_{SPU}$ is a session key known only to the service provider station 20 and the end-user station with identity U 2) $K_{TU}$ is a session key known only to the name translator station 30 and the end-user station with identity U 3) $K_{SPT}$ is a key known only to the service provider station 20 and the name translator station 30.

Illustratively, each of these session keys are agreed upon by the relevant parties using public key cryptographic techniques. The use of public key techniques for key agreement is discussed below. (See U.S. patent application Ser. No. 07/789,700 entitled "Cryptographic Method for Portable Communication System", filed Nov. 8, 1991, for M. J. Beller, L. S. Chang, and Y. Yacobi and assigned to the assignee hereof).

Public key cryptography is based on a mathematical problem believed to be hard (i.e., not solvable in polynomial time on the average). One example of such a mathematical problem is the Modular Square Root problem which is defined as follows.

Input: N,y, where $y=x^2$ mod N, and $N=pq$ where p and q are large primes

Output: x

Calculating square roots is easy if P and q are known but hard if p and q are not known. Illustratively, a session key K known only to two stations i and j may be agreed upon as follows. Illustratively, there is a public key N known to both stations i and j and a secret key known only to the station j. The secret key illustratively comprises the large primes p and q, where $N=pq$. The station i selects a random number x and performs the easy operation $Y=x^2$ mod N using the public key. The quantity Y is transmitted through the network to the station j. The station j, which is in possession of the secret keys p and q, is able to obtain $\sqrt{y}$ mod $N=x$. Thus, both stations i and j are in possession of the quantity x which can serve as the session key K. (It should be noted that When the modulus N is a product of two primes, $\sqrt{y}$ mod N has four solutions and the right one is colored, e.g, With thirty leading zeroes.) Using this technique the keys $K_{SPT}$ and $K_{TU}$ are established. The key $K_{SPU}$ is also established in this manner but with using the name translator station 30 as an intermediary for communication between the service provider station 20 and the end-user station so that the service provider station 20 never learns the actual identity U of any end-user station. Note that the intermediary (i.e., the station 30) does not have the secret key p and q so that it never learns the session key $K_{SPU}$.

Once the session keys are agreed upon using public key cryptography in the manner described above, actual information is encrypted using conventional cryptography. Conventional cryptography makes use of an encipherment function such as the National Bureau of Standards Data Encryption Standard (DES). One way to use an encipherment function is the electronic code book technique. In this technique, a plain text message M is encrypted to produce the cipher text message c by the formula $c=f(M,K)$ where x is a session key (e.g., $K_{SPU}$, $K_{TU}$, or $K_{SPT}$). It is the cipher text message c which is then transmitted to the recipient. The cipher text message c can only be decrypted with the knowledge of the session key x to obtain the plain text message $M=f^{-1}(C,K)$. In this manner two stations with knowledge of a key x can communicate privately.

In the following discussion, a quantity Z encrypted with $K_{SPU}$ is denoted by [Z], a quantity Z encrypted with $K_{TU}$ is denoted by $<Z>$, and a quantity z encrypted with $K_{SPT}$ is denoted by {Z}.

Now consider an end-user station (e.g., station 14) with actual identity U which requests service from the information service provider station 20 via the network 12. The end-user station transmits its actual identity u via the network 12 to the name translator station 30. If the end-user station is a first time user or if there is a need to update the user profile information stored at the filter station 40, some encrypted profile information [Pr] is also transmitted to the name translator station 30. The user profile information enables an end-user to indicate the type of information it wishes to receive. If there is no profile information which needs to be transmitted, the end-user transmits only the actual identity U to the name translator station 30.

The name translator station 30 translates the actual identity U to the pseudonym U', which pseudonym is known to the service provider station 20 and filter station 40. The actual identity U is unknown to both the service provider station 20 and filter station 40. The name translator station 30 also adds an additional layer of encryption to any profile information [Pr] which may arrive with the identity U. Thus, the name translator station 30 transmits via the network 12 the pseudonym U' and {[Pr]} to the filter station 40. The extra layer of encryption is added to the profile information Pr because [Pr], U enters the name translator station 30. If [Pr], U' leaves the name translator station 30, it will be possible for someone to correlate U and U'. It should be noted that because the name translator station 30 does not know $K_{SPU}$ it cannot decrypt [Pr] to obtain Pr. For a discussion of double encryption, see J. G. Steiner et al, "Kerberos: An Authentication System for Open System Networks", Usenix Conference proc., Winter 1988, pp 191-202.

The filter station 40 stores the doubly encrypted profile information {[Pr]} as part or all of the user profile for the end-user station corresponding to the pseudonym U'. The filter station 40 never learns the actual identity U of the end-user station. The profile information is stored at the filter station 40 in the doubly encrypted form in the memory 42.

The filter station 40 transmits the pseudonym U' to the service provider station 20 via the network 12. In response, the service provider station 20 transmits via the network 12 the doubly encrypted description {[D]} to the filter station 40. The description o contains information about particular services offered by the service provider station 20. At the filter station 40, the doubly encrypted description {[D]} is compared with the doubly encrypted user profile information {[Pr]} to determine which specific information should be transmitted from the service provider station 20 to the end-user. This comparison is performed by the processor 44 located at the filter station 40. Thus, an indicator generated as a result of the comparison is transmitted from the filter station 40 via the network 12 to the service provider station 20. The indicator identifies specific information which is to be transmitted by the service provider to the end-user. It should be noted that the filter station 40 has no cryptographic keys. Thus, the filter station 40 works with doubly encrypted description information {[D]} and doubly encrypted profile information {[Pr]}, but cannot decrypt the encrypted description information and the encrypted user profile information.

Based on the received indicator, the service provider station 20 transmits via the network 12 the specific encrypted information [M] and the pseudonym U' to the name translator station 30 because the service provider station 20 does not know the actual identity U associated with the pseudonym U'. The name translator station 30 cannot decrypt [M] because it does not have $K_{SPU}$. The name translator station U' back to U and adds an additional encryption layer to the information M to form <[M]>. The second encryption layer is added because if the name translator station were to output [M], U it would be possible for an eavesdropper to correlate the input [M], U' with the output [M], U and thereby correlate U' and U. The name translator station is preferably able to withstand timing correlation attacks and length correlation attacks on its input/output. Therefore, the name translator station serves a large population and messages are truncated into lengths selected from few fixed lengths. In addition, delays are introduced so that the name translator station outputs only when sufficiently many candidates of the same length have arrived, and then it outputs in lexicographic order of output, for example, rather than first come, first served.

The doubly encrypted information <[M]> is transmitted through the network 12 to the desired recipient user station 14 which decrypts <[M]> through its knowledge of $K_{SPU}$ and $K_{TU}$ to obtain the plain text information M.

Note that the name translator station 30 does not and cannot decrypt any encrypted information that it receives, it only adds a second layer of encryption to [Pr] and to [M].

In the special case of on-demand services, the above-described method may be modified to eliminate use of the filter station 40. An end-user station requesting an on-demand service transmits the actual identity U to the name translator station 30. The name translator station 30 translates U→U' and transmits U' to the service provider station 20. The service provider station 20 transmits encrypted information [M] and U' back to the name translator station 30. The name translation station adds a second layer of encryption to form <[M]> and translates U'→U. The doubly encrypted information <[M]> is then transmitted to the end-user station with the actual identity U. The doubly encrypted information <[M]> is then decrypted at the end-user station using the keys $K_{SPU}$ and $K_{TU}$.

To summarize, in a preferred embodiment, the inventive technique relies on four logically separate entities:
a) a service provider which provides information items M and descriptions D,
b) a filter which stores end-user profiles Pr in encrypted form, receives information descriptions D in encrypted form from the service provider, matches descriptions to the profiles and sends final decisions on information to be transmitted to the service provider,
c) a name translator which translates actual end-user names U which are unknown to the service provider and filter to pseudonyms U' which are known to the service provider and filter, and
d) end-users.

These logical entities are utilized in combination with cryptographic techniques to maintain the privacy of both the actual information M and user profiles Pr.

Using the inventive technique, the only information that the information provider may gather is statistical information, e.g, frequency of requests for particular information items and correlations between user profiles and different types of information requested. The information provider cannot correlate information requests with particular end-users.

In addition, the actual user identities are known only to the name translator. The name translator cannot gain access to the user profile information as the user profile information is encrypted in a manner so that it cannot be decrypted by the name translator. Thus, the name translator cannot associate actual names U with decrypted profile information Pr. Similarly, the filter only associates the pseudonyms U' with encrypted profile information but does not associate the actual names U with decrypted profile information. In addition, although the name translator serves as an intermediatory for transmission of information items M from the service provider to the end-user because the service provider does not know the actual identity of the end-user, the information items are encrypted so that they are not accessible to the name translator.

Thus, in a preferred embodiment of the invention there is no single logical entity which knows the actual user identity, the user profile, and the actual transmitted information. Instead, in accordance with the invention, the actual identity and user profile of each end-user are maintained at first and second separate logical entities (i.e., name translator and filter) and encrypted in a manner so as to be inaccessible to the second and first logical entities, respectively. In addition, although the actual information transmitted is routed through an intermediate entity (i.e, name translator), the actual information is encrypted so that it is inaccessible to the intermediate entity. Accordingly, the privacy of the end-user is maintained at a high level.

Another way to view the invention is as follows: the filter knows nothing, the service provider knows what information is transmitted, and the name translator to whom information is transmitted. Thus, any implementation which separates the name translator and service provider into separate entities may be utilized. For example, the network, filter and name translator may be provided by one entity and the service provider is a separate entity. Alternatively, the network, filter and service provider may be one entity and the name translator is a separate entity.

Finally, the above-described embodiments of the invention are intended to be illustrative only. Numerous alternative embodiments may be devised by those skilled in the art without departing from the scope of the following claims.

We claim:

1. A method for delivering information via a communication network comprising the steps of:
   a) transmitting an identity U of an end-user station via the network to a name translator station,
   b) at the name translator station, translating the identity U to a pseudonym U',
   c) transmitting the pseudonym U' from the name translator station via the network to a filter station,
   d) transmitting the pseudonym U' from the filter station via the network to a service provider station,
   e) transmitting from the service provider station via the network to the filter station an encrypted information description describing information available from the service provider station, f) at the filter station, comparing the encrypted information description with an encrypted profile of the end-user station to determine specific information to be transmitted from the service provider station to the end-user station, g) transmitting an indicator from the filter station via the network to the service provider station indicating said specific information to be transmitted to the end-user, h) transmitting said specific information via the network and via the name translator station to the end-user station in an encrypted form so that the specific information is not accessible to the name translator station, i) decrypting the specific information for use at the end-user station.

2. The method of claim 1 wherein said profile of the end-user station is stored at the filter station and encrypted so that said profile is not accessible to the name translator station.

3. The method of claim 1 wherein said step (h) comprises
transmitting the specific information from the service provider station to the name translator station via the network with a first layer of encryption, so that the specific information is not accessible to the name translator station,
adding a second layer of encryption to said specific information at said name translator station, and
transmitting said specific information with two layers of encryption, via said network to said end-user station.

4. The method of claim 1 further comprising the steps of
encrypting user profile information with a first layer of encryption so tat the user profile information is not accessible to the name translator station,
transmitting the user profile information with the first layer of encryption to the name translator station,
encrypting the user profile information with a second layer of encryption at the name translator station,
transmitting the user profile information with two layers of encryption to the filter station, and
storing the user profile information with two layers of encryption at the filter station.

5. The method of claim 4 wherein said information description has two levels of encryption.

6. A method for delivering information via a communication network comprising
a) transmitting an identity U of an end-user via the network to a name translator station,
b) at the name translator station, translating the identity U to a pseudonym U′,
c) transmitting the pseudonym U′ to a service provider station,
d) transmitting information in response to the pseudonym U′ from the service provider station to the name translator station in encrypted form,
e) transmitting the information in encrypted form from the name translator station via the network to said end-user.

7. The method of claim 6 further comprising transmitting the information with a first layer of encryption from the service provider station to the name translator station so that the information is not accessible to the name translator station and encrypting the information with a second layer of encryption at the name translator station.

8. The method of claim 7 wherein said information is encrypted with said first layer of encryption using a first key known only to said service provider station and said end-user and with said second layer of encryption using a second key known only to said name translator station and said end-user.

9. The method of claim 6 further comprising
transmitting the pseudonym U′ to a filter station,
transmitting an encrypted information description from the service provider station to the filter station,
comparing at the filter station, the encrypted information description with an encrypted user profile to determine the information to be transmitted from the service provider station to the end-user.

10. The method of claim 9 wherein said user profile is encrypted so that said user profile is not accessible to the name translator station.

11. The method of claim 9 further comprising the steps of
transmitting user profile information to said name translator station encrypted with a first layer of encryption using a first key known only to said end-user and said service provider station,
at said name translator station encrypting said user profile information with a second layer of encryption using a third key known only to said service provider station and said name translator station,
transmitting the doubly encrypted user profile information via said network to said filter station, and
storing said user profile information in a memory at said filter station.

12. The method for delivering specific information from a service provider to a plurality of end-users each having an identity via a communication medium comprising the steps of
translating the identities of said end-users into pseudonyms at translation means and communicating the pseudonyms to filter means from said translation means to access encrypted user profiles,
determining from said profiles specific information for delivery to specific ones of said end-users from said service provider, and
delivering via said communication medium said specific information in encrypted form from said service provider to said translation means and from said translation means to said specific ones of said end-users.

13. The method of claim 12 wherein said profiles are encrypted in a manner so as not be accessible to said translation means and wherein said pseudonyms are not retranslatable by said filter means into said end-user identities.

14. The method of claim 12 wherein said specific information if encrypted so that said specific information is accessible to said specific end-users but not accessible to said translation means.

* * * * *